US010204252B2

(12) United States Patent
Pasik et al.

(10) Patent No.: US 10,204,252 B2
(45) **Date of Patent: *Feb. 12, 2019**

(54) INDICIA READER THAT SIMULTANEOUSLY OPERATES AS A POINT-OF-TRANSACTION INDICIA READER AND A SERIAL PORT DEVICE

(71) Applicant: Hand Held Products, Inc., Fort Mill, SC (US)

(72) Inventors: Gregory Pasik, Auburn, NY (US); James S. Ledwith, Lansing, NY (US); Joseph Walczyk, Syracuse, NY (US); Barry H. Keys, Batavia, NY (US); Dennis H. Cudzillo, Camillus, NY (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/592,243

(22) Filed: May 11, 2017

(65) Prior Publication Data

US 2017/0316239 A1 Nov. 2, 2017

Related U.S. Application Data

(63) Continuation of application No. 11/584,239, filed on Oct. 20, 2006, now Pat. No. 9,652,650.

(51) Int. Cl.
*G06K 7/14* (2006.01)
*G06K 17/00* (2006.01)

(52) U.S. Cl.
CPC .......... *G06K 7/14* (2013.01); *G06K 17/0022* (2013.01)

(58) Field of Classification Search
CPC .................................................. G06K 17/0022
See application file for complete search history.

(56) References Cited

U.S. PATENT DOCUMENTS 5,157,687 A * 10/1992 Tymes ................ G06K 7/0008 235/385
5,233,167 A * 8/1993 Markman ........... G07G 1/0018 235/375
5,258,604 A 11/1993 Behrens et al.
5,875,415 A 2/1999 Lieb et al.
6,299,063 B1 * 10/2001 Freeman ................ G06F 3/002 235/375
6,415,341 B1 7/2002 Fry et al.
6,619,549 B2 * 9/2003 Zhu .................... G06K 7/10881 235/462.25
6,705,527 B1 3/2004 Kelly et al.
6,758,403 B1 7/2004 Keys et al.
(Continued)

*Primary Examiner* — Suezu Ellis
(74) *Attorney, Agent, or Firm* — Additon, Higgins & Pendleton, P.A.

(57) ABSTRACT

An indicia reader system includes: an indicia reader for reading symbol indicia and producing a symbol signal representative of the symbol indicia, the indicia reader capable of transferring and receiving data formatted in a plurality of protocols; a controller capable of transferring and receiving data formatted in a plurality of protocols; and, a translation interface for translating data from the controller which is in a first protocol to a second protocol for receipt by the indicia reader.

17 Claims, 5 Drawing Sheets

(56) References Cited

U.S. PATENT DOCUMENTS

| | | | | |
|---|---|---|---|---|
| 6,775,034 | B1 * | 8/2004 | Morford | B82Y 10/00 358/424 |
| 6,811,088 | B2 | 11/2004 | Lanzaro et al. | |
| 7,093,760 | B1 * | 8/2006 | Collins, Jr. | G06K 7/10 235/462.01 |
| 7,311,259 | B2 | 12/2007 | Watanabe et al. | |
| 9,652,650 | B2 * | 5/2017 | Pasik | G06K 7/14 |
| 2002/0125323 | A1 | 9/2002 | Marrs et al. | |
| 2004/0079906 | A1 * | 4/2004 | Balog | G07D 7/128 250/556 |
| 2006/0138232 | A1 * | 6/2006 | Hammerslag | G06K 7/0004 235/440 |
| 2006/0239448 | A1 * | 10/2006 | Pang | G07G 1/14 235/380 |
| 2007/0228137 | A1 | 10/2007 | Bhella et al. | |
| 2008/0121715 | A1 | 5/2008 | Field | |
| 2008/0230607 | A1 | 9/2008 | Etten | |

* cited by examiner

OA
114
112
115
116
113

T
D
IMAGING OPTICS
ILLUMIN. OPTICS
Aimer Optics
Aperture
I.S.
Aimer L.S.
I.S. P.S.
Aimer P.S.
IMAGE SENSOR
Memory
Microcontroller
BUS
Host Processor
Memory
Communications Module
Network
NETWORK COMPUTER
114
118
120
124
130
131
132
133
136
142
144
146
148
150
152
154
160
162
166
168
180

112
112
112
112
190
190
190
190
Transaction Processing System
Transaction Processing System
Transaction Processing System
Transaction Processing System
192
194
LOCAL SERVER
REMOTE SERVER

INDICIA READER THAT SIMULTANEOUSLY OPERATES AS A POINT-OF-TRANSACTION INDICIA READER AND A SERIAL PORT DEVICE

FIELD OF THE INVENTION

The present invention relates to indicia reading devices, and more particularly to a method of updating indicia reading devices.

BACKGROUND

Indicia reading devices (also referred to as scanners, readers, etc.) typically read data represented by printed indicia, (also referred to as symbols, symbology, bar codes, etc.) For instance one type of a symbol is an array of rectangular bars and spaces that are arranged in a specific way to represent elements of data in machine readable form. Indicia reading devices typically transmit light onto a symbol and receive light scattered and/or reflected back from a bar code symbol or indicia. The received light is interpreted by an image processor to extract the data represented by the symbol. Optical indicia reading devices typically utilize visible light. Laser indicia reading devices typically utilize transmitted laser light.

One-dimensional (1D) optical bar code readers are characterized by reading data that is encoded along a single axis, in the widths of bars and spaces, so that such symbols can be read from a single scan along that axis, provided that the symbol is imaged with a sufficiently high resolution along that axis.

In order to allow the encoding of larger amounts of data in a single bar code symbol, a number of 1D stacked bar code symbologies have been developed which partition encoded data into multiple rows, each including a respective 1D bar code pattern, all or most all of which must be scanned and decoded, then linked together to form a complete message. Scanning still requires relatively higher resolution in one dimension only, but multiple linear scans are needed to read the whole symbol.

A class of bar code symbologies known as two dimensional (2D) matrix symbologies have been developed which offer orientation-free scanning and greater data densities and capacities than 1D symbologies. 2D matrix codes encode data as dark or light data elements within a regular polygonal matrix, accompanied by graphical finder, orientation and reference structures. Often times an optical reader may be portable and wireless in nature thereby providing added flexibility. In these circumstances, such readers form part of a wireless network in which data collected within the terminals is communicated to a host computer situated on a hardwired backbone via a wireless link. For example, the readers may include a radio or optical transceiver for communicating with a network computer.

Conventionally, a reader, whether portable or otherwise, may include a central processor which directly controls the operations of the various electrical components housed within the bar code reader. For example, the central processor controls detection of keyboard entries, display features, wireless communication functions, trigger detection, and bar code read and decode functionality.

Efforts regarding such systems have led to continuing developments to improve their versatility, practicality and efficiency.

DETAILED DESCRIPTION

Reference will now be made to exemplary embodiments of the invention which are illustrated in the accompanying drawings. This invention, however, may be embodied in various forms and should not be construed as limited to the embodiments set forth herein. Rather, these representative embodiments are described in detail so that this disclosure will be thorough and complete, and will fully convey the scope, structure, operation, functionality, and potential of applicability of the invention to those skilled in the art. Wherever possible, the same reference numbers will be used throughout the drawings to refer to the same or like parts. The term "scan" or "scanning" use herein refers to reading or extracting data from an information bearing indicia or symbol.

An exemplary indicia reader system in accordance with the invention may be adapted for reading symbol indicia for numerous functions. A detailed description of indicia readers and their operation is disclosed in commonly owned published United States Patent Application Publication No. 20030029917 entitled OPTICAL READER FOR IMAGING MODULE and United States Patent Application Publication No. 20030019934 entitled OPTICAL READER AIMING ASSEMBLY COMPRISING APERTURE, United States Patent Application Publication No. 20040134989 entitled DECODER BOARD FOR AN OPTICAL READER UTILIZING A PLURALITY OF IMAGING FORMATS which are hereby incorporated herein by reference.

Figure 1:
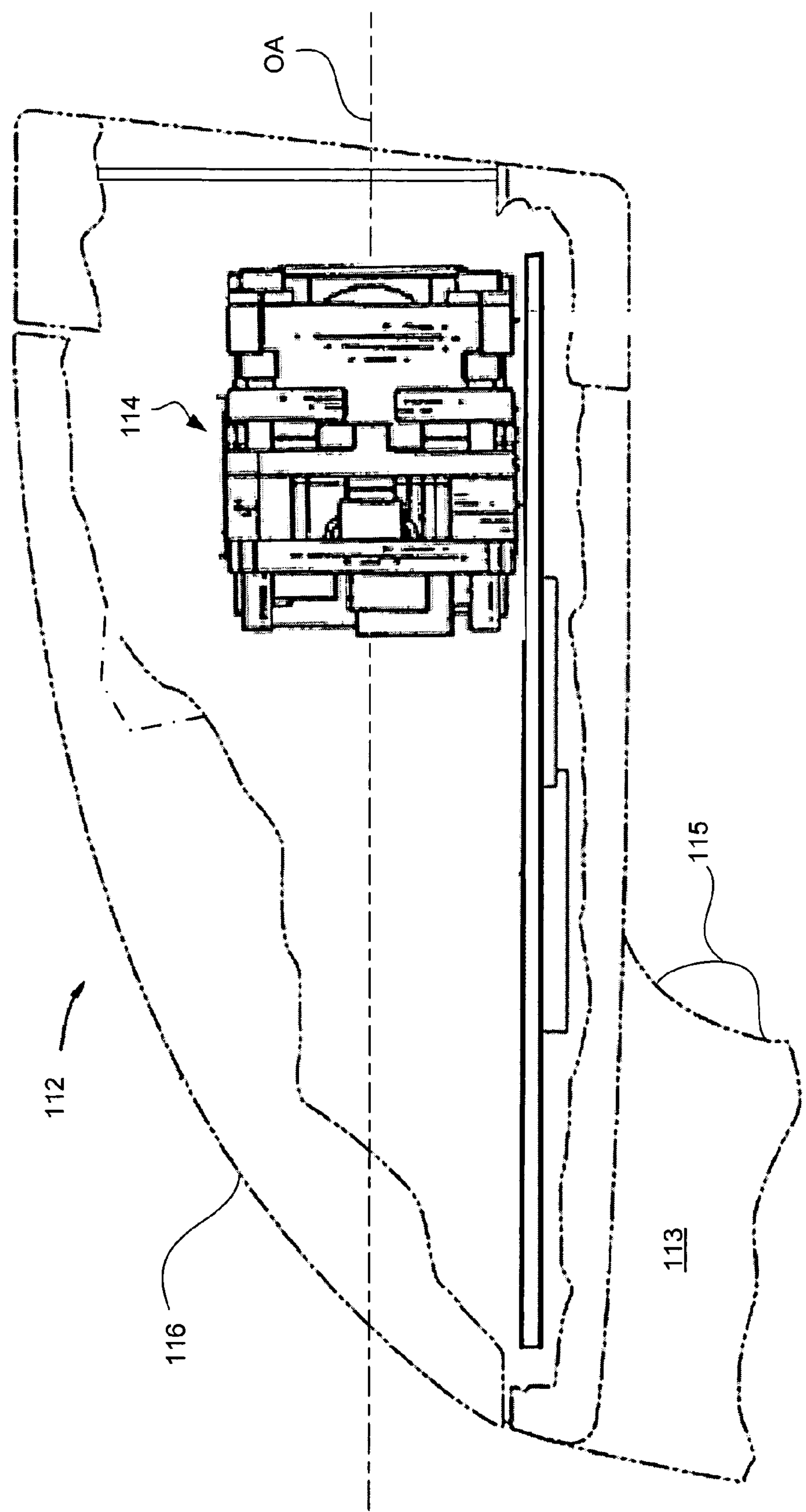
FIG. 1 is a fragmentary partially cutaway side view of an exemplary indicia reader in accordance with the present invention.
Figure 2:
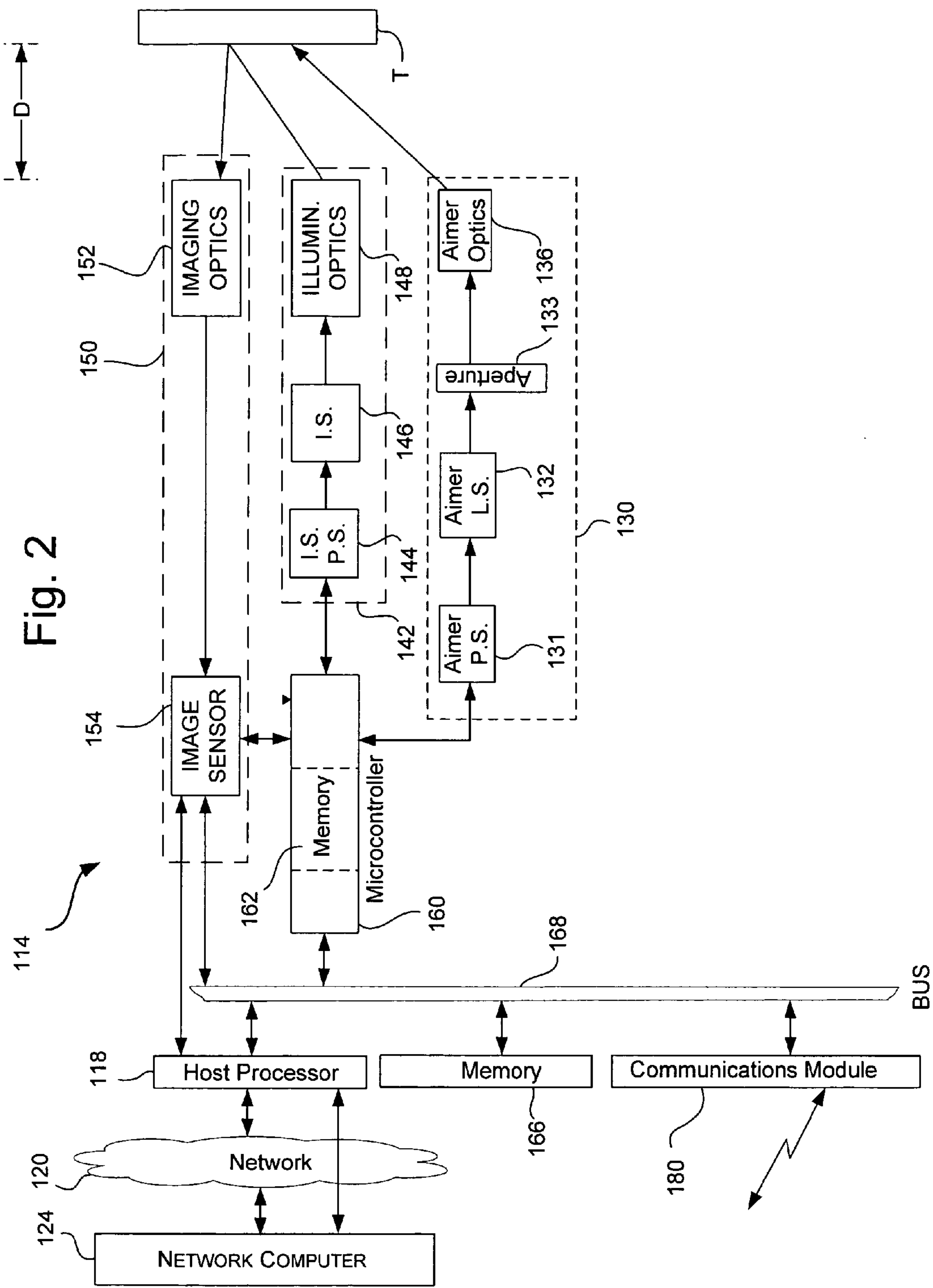
FIG. 2 is a block schematic diagram of an exemplary indicia reader in accordance with the present invention.

Referring to FIGS. 1 and 2, an optical indicia reader 112 may have a number of subsystems for capturing and reading images, some of which may have symbol indicia provided therein. Reader 112 may have an imaging reader assembly 114 provided within a head portion or housing 116 which may be configured to be hand held by a handle portion 113. A trigger 115 may be used to control operation of the reader 112. The head portion 116 may have a medial plane MP selected so that the hand-held imager is held with the head portion generally in a horizontal plane. The medial plane MP will generally be perpendicular to the face of the scanning head 116. Generally operators have a tendency to hold the medial plane of the head portion of the imager approximately normal to the plane of the target when collecting data. Image reader assembly 114 has imaging receive optics 152 having an optical axis (OA) for receiving light reflected from a target T and directing or projecting the reflected light from the target T to an image sensor 154. The optical axis is a line of symmetry through the imaging optics.

The receive optics 152 has a focal point wherein parallel rays of light coming from infinity converge at the focal point. If the focal point is coincident with the image sensor, the target (at infinity) is "in focus". A target T is said to be in focus if light from target points are converged about as well as desirable at the image sensor. Conversely, it is out of focus if light is not well converged. "Focusing" is the procedure of adjusting the distance between the receive optics and the image sensor to cause the target T to be approximately in focus.

The target may be any object or substrate and may bear a 1D or 2D bar code symbol or text or other machine readable indicia. A trigger 115 may be used for controlling full or partial operation of the reader 112.

Image sensor 154 may be a two-dimensional array of pixels adapted to operate in a global shutter or full frame operating mode which is a color or monochrome 2D CCD, CMOS, NMOS, PMOS, CID, CMD, etc. solid state image sensor. This sensor contains an array of light sensitive photodiodes (or pixels) that convert incident light energy into electric charge. Solid state image sensors allow regions of a full frame of image data to be addressed. An exemplary CMOS sensor is model number MT9V022 from Micron Technology Inc. or model number VC5602V036 36CLCC from STMicroelectronics.

Further description of image sensor operation is provided in commonly owned U.S. patent application Ser. No. 11/077,995 entitled "BAR CODE READING DEVICE WITH GLOBAL ELECTRONIC SHUTTER CONTROL" filed on Mar. 11, 2005, which is hereby incorporated herein by reference in it's entirety.

In a full frame (or global) shutter operating mode, the entire imager is reset before integration to remove any residual signal in the photodiodes. The photodiodes (pixels) then accumulate charge for some period of time (exposure period), with the light collection starting and ending at about the same time for all pixels. At the end of the integration period (time during which light is collected), all charges are simultaneously transferred to light shielded areas of the sensor. The light shield prevents further accumulation of charge during the readout process. The signals are then shifted out of the light shielded areas of the sensor and read out.

Features and advantages associated with incorporating a color image sensor in an imaging device, and other control features which may be incorporated in a control circuit are discussed in greater detail in U.S. Pat. No. 6,832,725 entitled "An Optical Reader Having a Color Imager" incorporated herein by reference. It is to be noted that the image sensor 154 may read images with illumination from a source other than illumination source 146, such as by illumination from a source located remote from the reader.

The output of the image sensor may be processed utilizing one or more functions or algorithms to condition the signal appropriately for use in further processing downstream, including being digitized to provide a digitized image of target T.

Microcontroller 160 may perform a number of functions. The particulars of the functionality of microcontroller 160 may be determined by or based upon certain parameters which may be stored in memory or firmware. One such function may be controlling the amount of illumination provided by illumination source 146 by controlling the output power provided by illumination source power supply 144. Microcontroller 160 may also control other functions and devices.

An exemplary microcontroller 160 is a CY8C24223A made by Cypress Semiconductor Corporation, which is a mixed-signal array with on-chip controller devices designed to replace multiple traditional MCU-based system components with one single-chip programmable device. It may include configurable blocks of analog and digital logic, as well as programmable interconnects.

Microcontroller 160 may include a predetermined amount of memory 162 for storing firmware and data. The firmware may be a software program or set of instructions embedded in or programmed on the microcontroller which provides the necessary instructions for how the microcontroller operates and communicates with other hardware. The firmware may be stored in the flash ROM of the microcontroller as a binary image file and may be erased and rewritten. The firmware may be considered "semi-permanent" since it remains the same unless it is updated. This firmware update or load may be handled by a device driver.

The components in reader 112 may be connected by one or more bus 168 or data lines, such as an Inter-IC bus such as an $I^2C$ bus, which is a control bus that provides a communications link between integrated circuits in a system. This bus may connect to a host computer in relatively close proximity, on or off the same printed circuit board as used by the imaging device. PC is a two-wire serial bus with a software-defined protocol and may be used to link such diverse components as the image sensor 154, temperature sensors, voltage level translators, EEPROMs, general-purpose I/O, ND and D/A converters, CODECs, and microprocessors/microcontrollers.

The functional operation of the host processor 118 may involve the performance of a number of related steps, the particulars of which may be determined by or based upon certain parameters stored in memory 166 which may be any one of a number of memory types such as RAM, ROM, EEPROM, etc. In addition some memory functions may be stored in memory 162 provided as part of the microcontroller 160.

One of the functions of the host processor 118 may be to decode machine readable symbology provided within the target or captured image. One dimensional symbologies may include very large to ultra-small, Code 128, Interleaved 2 of 5, Codabar, Code 93, Code 11, Code 39, UPC, EAN, and MSI. Stacked 1D symbologies may include PDF, Code 16K and Code 49. 2D symbologies may include Aztec, Datamatrix, Maxicode, and QR-code. UPC/EAN bar codes are standardly used to mark retail products throughout North America, Europe and several other countries throughout the worlds. Decoding is a term used to describe the interpretation of a machine readable code contained in an image projected on the image sensor 154. The code has data or information encoded therein. Information respecting various reference decode algorithm is available from various published standards, such as by the International Standards Organization ("ISO").

Imaging reader assembly 114 may also have an aiming generator light source 132, aiming aperture 133, aiming optics 136, an illumination source(s) 146 and illumination optics 148.

Illumination and aiming light sources with different colors may be employed. For example, in one such embodiment the image reader may include white and red LEDs, red and green LEDs, white, red, and green LEDs, or some other combination chosen in response to, for example, the color of the symbols most commonly imaged by the image reader. Different colored LEDs may be each alternatively pulsed at a level in accordance with an overall power budget.

Aiming pattern generator 130 may include a power supply 131, light source 132, aperture 133 and optics 136 to create an aiming light pattern projected on or near the target which spans a portion of the receive optical system 150 operational field of view with the intent of assisting the operator to properly aim the scanner at the bar code pattern that is to be read. A number of representative generated aiming patterns are possible and not limited to any particular pattern or type of pattern, such as any combination of rectilinear, linear, circular, elliptical, etc. figures, whether continuous or discontinuous, i.e., defined by sets of discrete dots, dashes and the like.

Generally, the aiming light source may comprise any light source which is sufficiently small or concise and bright to provide a desired illumination pattern at the target. For example, light source 132 for aiming generator 130 may comprise one or more LEDs 134, such as part number NSPG300A made by Nichia Corporation.

The light beam from the LEDs 132 may be directed towards an aperture 133 located in close proximity to the LEDs. An image of this back illuminated aperture 133 may then be projected out towards the target location with a lens 136. Lens 136 may be a spherically symmetric lens, an aspheric lens, a cylindrical lens or an anamorphic lens with two different radii of curvature on their orthogonal lens axis. Alternately, the aimer pattern generator may be a laser pattern generator. The light sources 132 may also be comprised of one or more laser diodes such as those available from Rohm. In this case a laser collimation lens (not shown in these drawings) will focus the laser light to a spot generally forward of the scanning hear and approximately at the plane of the target T. This beam may then be imaged through a diffractive interference pattern generating element, such as a holographic element fabricated with the desired pattern in mind. Examples of these types of elements are known, commercially available items and may be purchased, for example, from Digital Optics Corp. of Charlotte, N.C. among others. Elements of some of these types and methods for making them are also described in U.S. Pat. No. 4,895,790 (Swanson); U.S. Pat. No. 5,170,269 (Lin et al) and U.S. Pat. No. 5,202,775 (Feldman et al), which are hereby incorporated herein by reference.

Image reader may include an illumination assembly 142 for illuminating target area T. Illumination assembly 142 may also include one or more power supplies 144, illumination sources 146 and illumination optics 148.

A communications module 180 provides a communication link from imaging reader 114 to other imaging readers or to other systems such as host processor 118, memory 166, network 120, or network computer 124.

Figure 3:
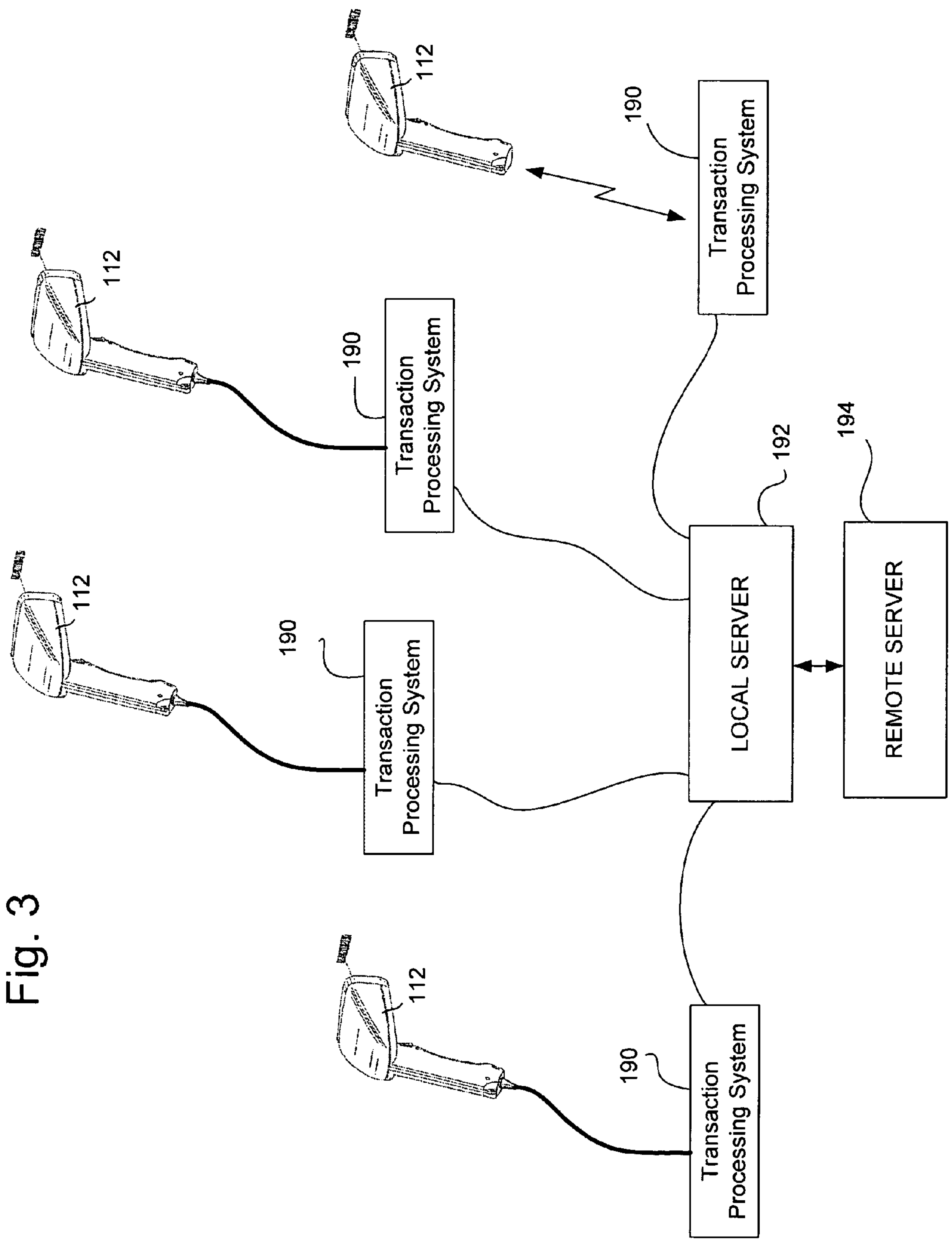
FIG. 3 is a block schematic diagram of an exemplary indicia reader system in accordance with the present invention.

FIG. 3 illustrates a scanning system configuration in accordance with the present invention, wherein a plurality of scanners 112 are being operated or utilized in a facility, such as a retail store. Each scanner may be in communication (wired or wireless) to a local transaction processing system 190, such as cash register. The transaction processing systems 190 may be in communication (wired or wireless) with a local server 192. End users, such as retail stores, typically have many scanners located in an area of proximity. Scanning performance, data integrity, user experience, customer experience and down time may contribute negative effects of not having the same firmware and/or configuration parameters common among all scanners being used in the same application.

Figure 4:
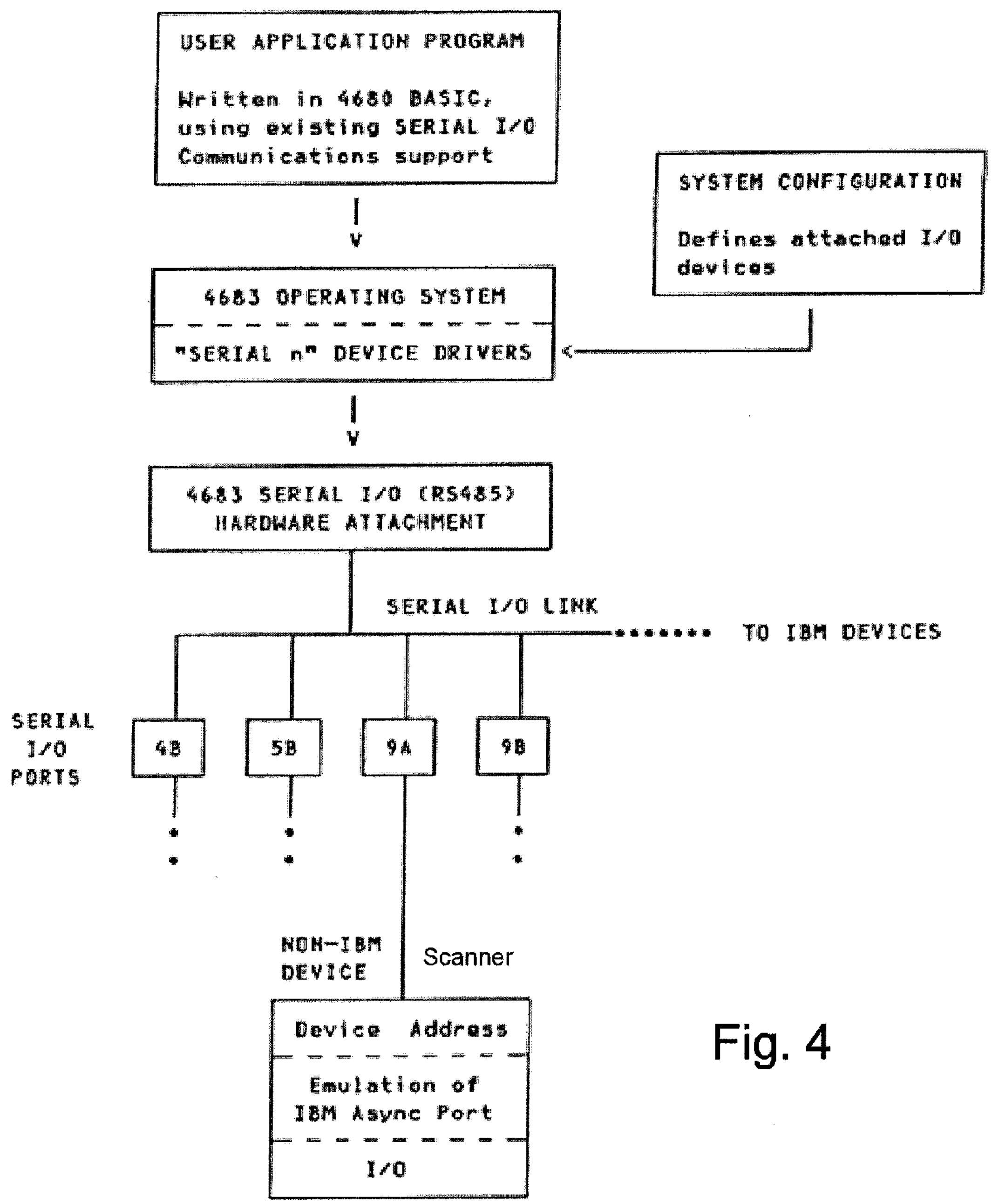
FIG. 4 is a block schematic diagram of an exemplary indicia reader system in accordance with the present invention.

FIG. 4 provides a block schematic diagram of a prior art reading device system for connecting a reading device to a terminal using a 4683 interface. The reader may attach through a 9A port to a 4683 Serial I/O interface which, electrically, is an RS485 interface operating at 187.5 Kbits/sec. The reader physically attaches to a connector on a 4683 base card. The 4683 Serial I/O interface is a multipoint network with each reader attached to a network having a unique "address". The method of logically attaching the reader to the 4683 Operating System is for the reader to appear to the OS as one of the 4683 Async (RS232) Feature Card ports. Therefore, the OS will not know whether it is talking to a feature card async port or a reader. To accomplish this, the reader uses the same address as one of the feature card async port addresses when communicating on the Serial I/O link. The reader understands and acts on commands sent to it by the OS which the OS thinks are being sent to the feature card and respond to the OS with the correctly formatted status and data (as the feature card) would. Application programming support may be provided through 4680 BASIC language. Transparency may be maintained for example such that an application for a feature card attached RS232 reader may also control a correspondingly configured reader attached through a 4683 Serial I/O link (RS485). Considerations for an end user when attaching a reader via the 4683 Serial I/O (RS485) interface may include that the user configure the system to indicate to the system that a feature card is installed with an Async (RS232) port selected, even though there may not be a feature card installed. Depending on the configuration of the terminal, the indication may refer to a feature card and RS232 device, or to the Serial I/O attached device which is emulating a feature card. An implementer must effectively emulate the Async (RS232) logical interface, normally supported by Feature C or D cards, but attach directly to an appropriate 4683 Serial I/O (RS485) tailgate port. The choice of specific port depends on the desired voltage availability and possible conflicts with other I/O devices that use the same port. The ports available for the reader attachment to the Serial I/O link are ports 4B, 56, 9A, and 9B. These numbers appear on the tailgate of the main processor board.

Figure 5:
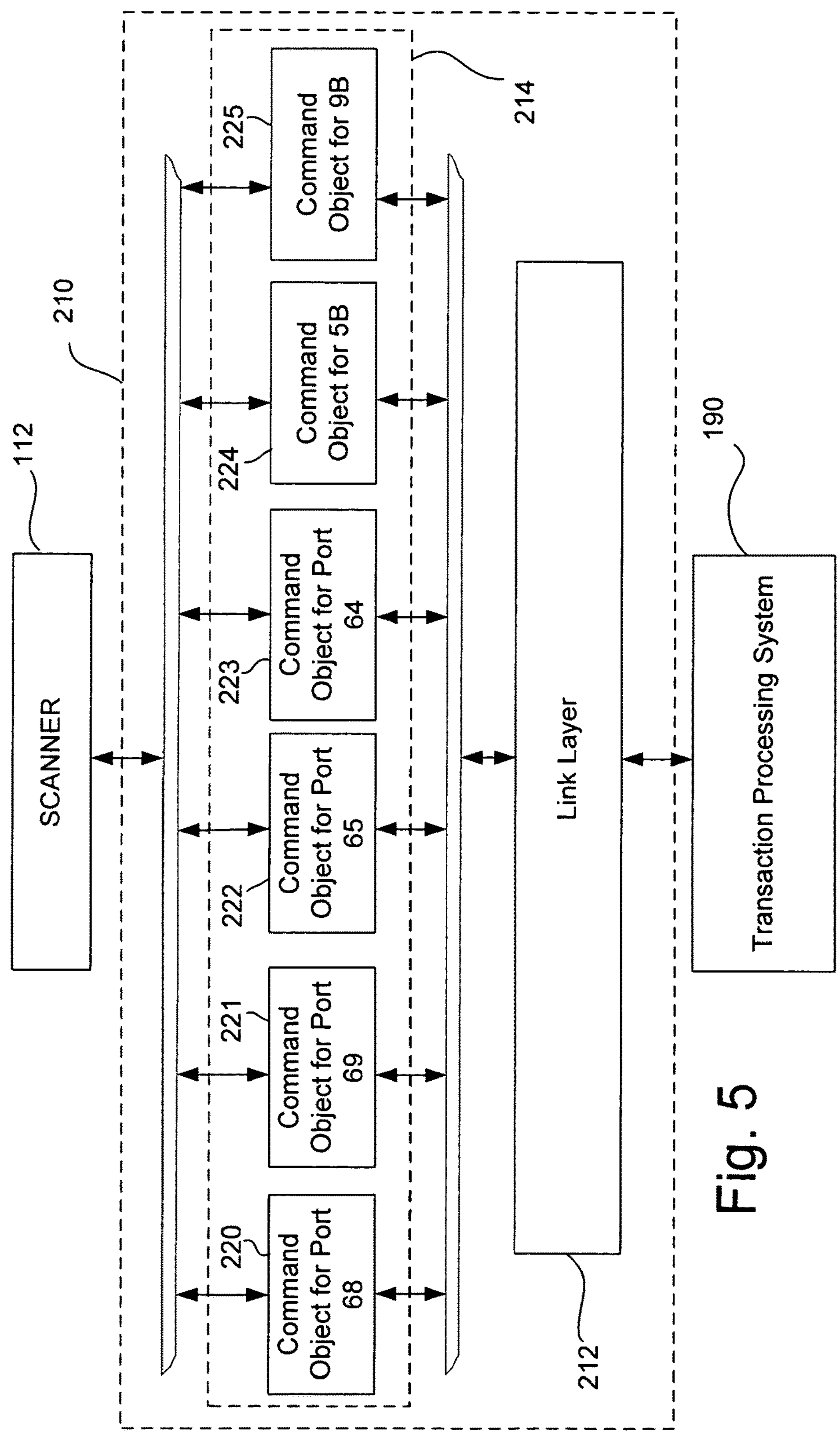
FIG. 5 is a block schematic diagram of an exemplary indicia reader system.

FIG. 5 illustrates an exemplary indicia reader or scanner system configuration for remotely upgrading the software of a reader/scanner that is attached to a host, such as a transaction processing system using a 4683 or RS485 interface. The system may be described in terms of a link layer 212 and a command layer 214 provided in a translation interface 210. The translation interface 210 provides translation between the interface the host 190 (such as a 4683 interface) is utilizing to a protocol the scanner utilizes. The 4683 interface allows a device to behave like any class of device regardless of its physical connection. For example a scanner that is physically connected to a Port 9 in the back of a transaction processing system such as a register may logically behave as a 5B, 9B, or 17 type device. The scanner may also act as an asynchronous serial device with a logical address of 64, 65, 68, or 69 which will be referred to as "6x." Due to the separation of physical and logical addresses a single device can also logically behave as two different devices.

An exemplary mode of operation of a handheld scanner is as a "56" device. The 5B interface however is not designed to allow large data transfers to or from the scanner, wherein the maximum packet size is set at 16 bytes. Because 5 of the bytes are overhead, only 9 bytes can be used for commands and data in each transmission. The process of downloading a large file over the 5B interface is therefore very time consuming and is not the intended use of the 5B interface.

The translation interface 210 allows a scanner to logically behave as both a 5B, 9B, or 17 device and an asynchronous serial (port 6x) device. The port 6x protocol is very similar to the port 5B, 9B, and 17 protocols that are already implemented in the scanner. The link definition, polling scheme, and logic controls are all shared between the currently implemented protocols and the port 6x protocol.

In an exemplary embodiment, multiple logical devices will share a single physical link. Low-level frame handling may be logically separated from higher level command processing. Using this configuration, a single low-level frame handling object may be created as well as multiple higher level command-handling objects.

It is contemplated that the indicia reader may be capable of changing the destination of the reader decoded output data from one port to another in response to a command received from the host device. For instance, the reader may redirect scanned output from the primary port such as Port 17 to a secondary port such as Port 69.

The command layer 214 may be comprised of low-level link command processing objects or ports 220-225 may receive data bits and recreate complete frames in the device. The link object is then responsible for verifying the integrity of the frame by calculating the CRCs. CRCs are cyclic redundancy check characters. The frame will be passed up to the command processing object if the CRCs match.

The low-level object will also be responsible for transmitting frame data to the host 190. The command processing layer 214 will be responsible for creating its address, send and receive counts, status, and data. The link layer 212 will then create a complete frame by adding CRCs and a terminating flag. The Link Layer 212 output packets may have the same format.

The command processing object implements the retail (5B, 9B, 17) or asynchronous serial (6x) interfaces with the possibility of having multiple instances of this object. Each object will have its own information such as: address, send and receive counts, status, internal state machines, and input and output buffers.

The command handling object will receive frames from the link layer 212 after the CRCs have been verified. It will be responsible for monitoring send and receive counts which may require resending a frame or resetting the communications. Commands are implemented as described in the individual protocol specifications. The command handling object will then update its send and receive counts, status, and append any required data which will be sent to the link layer to be output immediately or on the next poll.

Each port executes system commands without interrupting the operation of the other ports. For example, a scanner may act as both a 5B and 68 device. A command (such as a Power-On Reset command) received over port 5B cannot affect the operation of port 68. Broadcast commands may be handled by both logical ports.

The current port utilized to send output data over is controlled by a configuration setting, referred to as the primary port number selection. Barcode data should preferably go over retail ports and menu command data over 6x ports. Menu commands may be utilized to enable multiple ports.

An exemplary use of the exemplary reader is as the primary or sole scanner at a customer point of transaction (POT) in an establishment. Primary may mean the scanner at a POT is used to scan or image items more often than any other scanner or imager at the POT. A transaction may be any of a number of events that occur between a customer and an establishment, such as a store. The events may involve such things as exchange of monetary funds, payment for merchandise or service, return of merchandise, picking up merchandise that has already been paid for, or contracting for a service (such as leasing or renting).

As the primary scanner, merchandise with indicia can be read by it so that data decoded therefrom may be used for a stock keeping system (such as SKU) functionality such as sales, price look up, inventory, etc.

SKU is a common term for a unique numeric identifier, used most commonly in online business to refer to a specific product in inventory or in a catalog. A SKU is an identifier that is used by merchants to permit the systematic tracking of products and services offered to customers. Each SKU may be attached to an item, variant, product line, bundle, service, fee or attachment. SKUs are not always associated with actual physical items, but more appropriately billable entities. Each merchant using the SKU method will have their own personal approach to assigning the numbers, based on regional or national corporate data storage and retrieval policies. SKU tracking varies from other product tracking methods which are controlled by a wider body of regulations stemming from manufacturers or third-party regulations.

As described, an indicia reader or scanner may act as multiple devices at all times without reconfiguration. For example, it may operate as both a primary POT scanner and a serial port emulation device. Firmware for the POT scanner may be updated without removing the scanner from the POT by utilizing the scanner as a serial port emulation device. Data concerning retail type transactions may be transferred while operating in the scanner mode and other data such as operating system firmware may be transferred to the POT scanner when it is being utilized in the serial port mode.

Scanners and host system may be equipped with the ability to automatically query and communicate data, such as firmware amongst each other. Upgrading firmware from host to scanner and duplicating configuration parameters may be performed without human intervention to ensure scanners are operating at the same revision and have the same configuration parameters reduces user frustration, down time, data integrity and increase efficiencies.

At predetermined time intervals the host may broadcast various information, such as firmware revision, configuration parameters, etc. The host may then download the newer files and update scanners during a time of inactivity.

It should be understood that the programs, processes, methods and apparatus described herein are not related or limited to any particular type of computer or network apparatus (hardware or software). Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa. The illustrated embodiments are exemplary only, and should not be taken as limiting the scope of the present invention. For example, the steps of the flow diagrams may be taken in sequences other than those described, and more, fewer or other elements may be used in the block diagrams. Also, unless applicants have expressly disavowed any subject matter within this application, no particular embodiment or subject matter is considered to be disavowed herein.

The invention claimed is:

1. An indicia reader comprising:

firmware for controlling the operation of the indicia reader; and software that allows the indicia reader to operate as a point-of-transaction indicia reader while simultaneously operating as a serial port emulation device that receives data to upgrade the firmware;

wherein the indicia reader is a point of transaction indicia reader and data translation occurs at the point of transaction; and wherein the indicia reader changes a destination port of decoded output data in response to a command received from a host.

2. The indicia reader of claim 1, wherein the indicia reader has separate physical and logical addresses.

3. The indicia reader of claim 1, wherein the host comprises a host interface for communication with the indicia reader.

4. The indicia reader of claim 1, comprising a translation interface provided between the indicia reader and the host, being configured to translate data between a host interface and a protocol utilized by the indicia reader.

5. The indicia reader of claim 4, wherein the indicia reader is controlled by the translation interface to behave like any class of device regardless of physical connection type of the indicia reader with the host.

6. The indicia reader of claim 4, wherein the translation interface comprises a link layer and a command layer having a plurality of ports.

7. The indicia reader of claim 6, wherein the indicia reader is logically attached to a protocol of the indicia reader as a serial port.

8. The indicia reader of claim 6, wherein the indicia reader logically behaves as two different devices through any of the plurality ports at all times without reconfiguration of the indicia reader.

9. The indicia reader of claim 1, wherein the host utilizes menu commands to enable ports without interrupting operation of other ports.

10. The indicia reader of claim 1, wherein data being translated is firmware data.

11. The indicia reader of claim 1, wherein data being translated is firmware data and translation occurs at predetermined time intervals.

12. An indicia reader comprising:

firmware for controlling the operation of the indicia reader;

software that allows the indicia reader to operate as a point-of-transaction indicia reader while simultaneously operating as a serial port emulation device that receives data to upgrade the firmware; and a translation interface provided between the indicia reader and a host, being configured to translate data between a host interface and a protocol utilized by the indicia reader;

wherein the indicia reader has separate physical and logical addresses;

wherein the indicia reader is a point of transaction indicia reader and data translation occurs at the point of transaction; and wherein the indicia reader changes a destination port of decoded output data in response to a command received from the host.

13. The indicia reader of claim 12, wherein the translation interface comprises a link layer and a command layer having a plurality of ports.

14. The indicia reader of claim 13, wherein the indicia reader is logically attached to a protocol of the indicia reader as a serial port.

15. The indicia reader of claim 12, wherein the indicia reader is controlled by the translation interface to behave like any class of device regardless of physical connection type of the indicia reader with the host.

16. An indicia reader comprising:

firmware for controlling the operation of the indicia reader;

software that allows the indicia reader to operate as a point-of-transaction indicia reader while simultaneously operating as a serial port emulation device that receives data to upgrade the firmware; and a translation interface provided between the indicia reader and a host, being configured to translate data between a host interface and a protocol utilized by the indicia reader;

wherein the indicia reader has separate physical and logical addresses;

wherein the indicia reader logically behaves as two different devices without reconfiguration of the indicia reader;

wherein the indicia reader is a point of transaction indicia reader and data translation occurs at the point of transaction; and wherein the indicia reader changes a destination port of decoded output data in response to a command received from the host.

17. The indicia reader of claim 16, wherein data being translated is firmware data.

* * * * *